United States Patent [19]

Stegmeier

[11] Patent Number: 5,130,835
[45] Date of Patent: Jul. 14, 1992

[54] LIGHT WAVEGUIDE TELECOMMUNICATION SYSTEM HAVING ONE OR MORE OPTICAL SWITCHES LYING IN THE LIGHT WAVEGUIDE PATH

[75] Inventor: Herbert Stegmeier, Strasslach, Fed. Rep. of Germany

[73] Assignee: Siemens Aktiengesellschaft, Munich, Fed. Rep. of Germany

[21] Appl. No.: 590,017

[22] Filed: Sep. 28, 1990

[30] Foreign Application Priority Data

Sep. 29, 1989 [EP] European Pat. Off. ........ 89118078.8

[51] Int. Cl.$^5$ .............................................. H04J 14/02
[52] U.S. Cl. .................................... 359/124; 359/128
[58] Field of Search ................ 455/612, 610; 370/3, 370/18; 350/96.11, 96.13, 96.16; 359/117, 124, 128, 139; 385/16, 17

[56] References Cited

U.S. PATENT DOCUMENTS 4,886,335 12/1989 Yanagawa et al. ................ 370/3
4,989,199 1/1991 Rzeszewski ...................... 370/18

FOREIGN PATENT DOCUMENTS 0164395 7/1986 Japan ................................ 370/3
0084330 4/1988 Japan ................................ 370/3

Primary Examiner—Edward L. Coles, Sr.
Assistant Examiner—Kinfe-Michael Negash
Attorney, Agent, or Firm—Hill, Van Santen, Steadman & Simpson

[57] ABSTRACT

For the individual control of optical switches that lie in the light waveguide path of light-carrying useful signals and control signals, each optical switch in the light waveguide is preceded by an optical demultiplexer for extracting that portion of the light that carries a control signal formed with a switch address and with a switch instruction and which is transmitted together with the light carrying the useful signal in a tight wavelength division multiplex method. The optical control signal is supplied via an opto-electrical transducer to a decoder that allows the appertaining switch instruction to take effect at an optical switch only given receipt of the switch address of the appertaining optical switch. The optical components can be combined on an integrated optics module which carries an integrated circuit module for the electrical components.

9 Claims, 1 Drawing Sheet

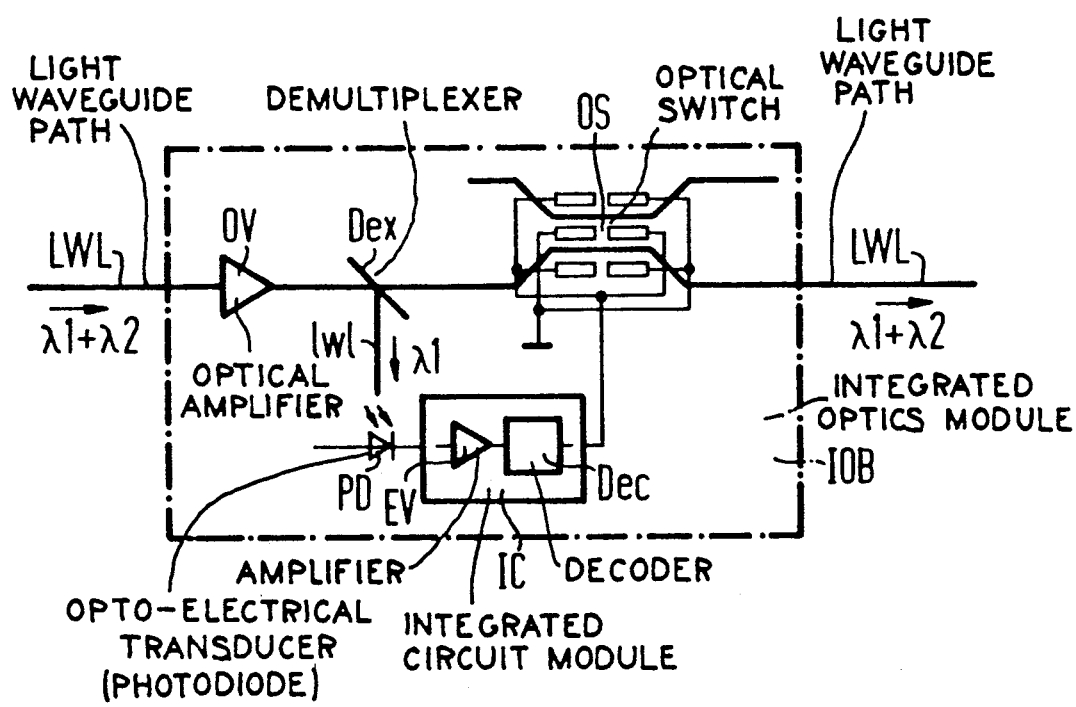

LIGHT WAVEGUIDE TELECOMMUNICATION SYSTEM HAVING ONE OR MORE OPTICAL SWITCHES LYING IN THE LIGHT WAVEGUIDE PATH

BACKGROUND OF THE INVENTION

1. Field of the Invention

The present invention relates to light waveguide telecommunication systems, and is more particularly concerned with structure for providing reconfigurations in a network of light waveguides.

2. Description of the Prior Art

In light waveguide (LWG) telecommunication systems, the task often arises to undertake reconfigurations in a network of light waveguides, for example for the purpose of a standby circuit, a reconnection or for the purpose of an exchange-oriented call set-up or, respectively, cleardown. Electromechanical-optical switches or integrated optical switches can be provided for this purpose; standby circuit measures and reconnections can, in addition, also be effected with the assistance of plug connectors that, however, require a frequently undesirable, direct manipulation. The drive of electromechanical-optical switches or of integrated optical switches as well occurs via corresponding control lines that, however, can quickly prove relatively involved in a branched LWG network having a plurality of decentralized switches.

A switching matrix of mirrors that can be electromechanically switched in position and, therefore, switched on and off, so to speak, is also known for the exchange-oriented structuring of LWG connections between LWG subscriber lines (see VDI Nachrichten, No. 36/7. September 1984, p. 17), whereby control signals output by the calling subscriber via his LWG subscriber line proceed from the switching matrix via small glass strips in the beam path to a selection evaluation device that initiates a control system to actuate a mirror in the path of the appertaining subscriber. Such a mirror matrix which represents a relatively complicated electromechanical structure, however, first of all assumes a concentration of the optical switch elements (mirrors) in precisely this matrix and, secondly, requires an additional matrix or star structure of control lines that lead to the individual mirrors of the matrix.

In a very similar fashion, such a concentration of the optical switch elements in a switching matrix network and a control line structure extending from the offering trunks thereof to a central control device or, respectively, from the latter to the individual switch elements may also be found in another, known optical switching system (see abstract of the Japanese patent 61-164 395).

An optical packet switching system having optical 2×2 coupling switches arranged in switching matrix stages is also known from the European patent 0 313 389, whereby each coupling switch comprises two buffer memory devices at its two inputs that lead to the input of an optical switchover device whose two outputs form the two coupling switch outputs, whereby the optical switchover device is preceded in the light waveguide path by an optical demultiplexer with which only light having a wavelength defined individually for a switching matrix stage can be coupled out from a routing header. Proceeding from this demultiplexer, the optical switchover device following in the waveguide path is controlled via an opto-electrical transducer, whereby the optical switchover device proceeds into its one switch condition or into its other switch condition dependent on whether or not light having the wavelength defined for the appertaining switching matrix stage is contained in the routing header. Such a control on the basis of control light individually associated to the switching matrix stages can be practical in a concentrated switching matrix network having relatively few switching matrix stages. If one wished to correspondingly also drive optical switches that are decentrally arranged in the light waveguide network and that can also not be driven switching matrix stage-wise, then this would require a multitude of switch-associated control wavelengths, whereby such a wavelength management, however, cannot be practically realized.

An optical switching system having a multi-stage N×N switching matrix network is already known in the art, for example the IEEE Communications Magazine Vol. 25, No. 5, 1987, pp. 50-55, in which the individual optical switching elements are respectively preceded by an optical delay element preceding which a path leading to the optical control element for controlling the appertaining optical switching element branches from the light waveguide. In this switching system, each of the individual useful signal bits to be through connected is respectively coded with its destination address. This, first of all, assumes a corresponding circuit-oriented expense and leads to correspondingly, increased transmission clock rates in the system which, on the other hand, proves inexpedient, particularly when individual bits are not to be respectively through connected in and of themselves but entire messages or when reroutings in the network are only to be undertaken at all at greater time intervals, for example for network reconfiguration in the case of a standby circuit.

SUMMARY OF THE INVENTION

The object of the present invention, therefore, is to provide an individual drive of optical switches that also decentrally arranged in a light waveguide network, this avoiding both a coding of the individual useful signal bits as well as light of a plurality of control wavelengths and that likewise does not require a separate control network leading to the individual optical switches.

The present invention is directed to a light waveguide telecommunication system having one or more optical switches lying in the LWG path of light carrying useful signals and control signals, these optical switches being controllable based on the measure of control signals coupled out from the light waveguide leading to the respective optical switch, whereby each optical switch in the light waveguide is preceded by an optical demultiplexer with which the light carrying the control signal transmitted via the light waveguide in wavelength-division multiplex with the light carrying the useful signal is coupled out and supplied to an opto-electrical transducer. This light waveguide telecommunication system, according to the present invention, is characterized in that a beam portion of the light carrying the control signal that is transmitted via the light waveguide in tight wavelength-division multiplex with the light carrying the useful signal that contains the entire control signal respectively formed by coding with a switch address and a switch instruction is coupled out in the optical demultiplexer and is supplied to a decoder circuit following the optical demultiplexer. The decoder circuit allows the appertaining switch instruction to take effect at an optical switch only given the reception of the switch address of the appertaining optical switch.

The present invention yields the advantage of being also able to actuate decentrally-arranged optical switches with remote control proceeding from the central location in a branched optical LWG network without requiring an additional control network for this purpose which leads to the optical switches in a bus structure or a star structure, whereby light in a plurality of control wavelength is not needed nor need the light that carries the useful signal be address coded.

BRIEF DESCRIPTION OF THE DRAWING

Other objects, features and advantages of the invention, its organization, construction and operation will be best understood from the following detailed description, taken in conjunction with the accompanying drawing on which there is a single figure which is a schematic representation of an examplary embodiment of a telecommunication system constructed in accordance with the present invention.

DESCRIPTION OF THE PREFERRED EMBODIMENT

In a scope necessary for an understanding of the invention, the drawing schematically illustrates a portion of a light waveguide (LWG) telecommunication system having an optical switch OS lying in the light waveguide path LWL-LWL. As likewise shown on the drawing, such an optical switch can be formed by a controllable electro-optical directional coupler.

In a controllable electro-optical directional coupler, two strip waveguides, narrow, thin strips generated by drive-in (of, for example, titanium into lithium niobate) in a substrate that have a higher optical refractive index than the substrate, extending extremely close proximity to one another, at a distance of, typically, approximately 5 $\mu$m, in a coupling region having a defined length, so that the optical fields overlap and optical energy can be coupled over from the one strip waveguide onto the other strip waveguide. Control electrodes that are charged with an electrical control signal that influences the over-coupling are situated in the coupling region next to and between the strip waveguides. When a corresponding control voltage is applied, no coupling occurs. The absence of a control voltage can be connected with a complete coupling (see the publication NTZ, Vol. 39, No. 12, 1986, pp. 828-830, FIGS. 3c and 3d, and telcom report Vol. 10, No. 2, 1987, pp. 90-98, FIG. 8).

The optical switch OS is preceded in the light waveguide LWL-LWL by an optical demultiplexer Dex. Such an optical demultiplexer can be formed in an intrinsically known manner by a beam splitter in the form of a partially-transmissive mirror that is additionally provided with dielectric interference filter layers (see telcom report, Vol. 6, 1983, supplement Nachrichtenuebertragung mit Licht, p. 111, left-hand column). The light waveguide lwl branching off from the light waveguide path LWL-LWL at the optical demultiplexer Dex leads to an opto-electrical transducer (photodiode) PD to whose output a decoder circuit Dec is connected via an amplifier EV. The optical switch OS can be driven via the decoder circuit Dec. As may be seen from the drawing, the optical demultipleaxer Dex, the optical electrical transducer PD and the optical switch OS can be combined on an integrated optics module IOB, preferably an indium phosphide crystal. As also indicated on the drawing, an integrated circuit module IC containing the decoder circuit Dec can also be hybridly applied on the integrated optical module IOB, whereby the amplifier EV can also be integrated in the integrated circuit module IC.

In the exemplary embodiment of the light waveguide telecommunication system of the present invention illustrated on the drawing, the optical demultipleaxer Dex is preceded by an optical amplifier OV. The optical assemblies of the optical amplifier OV are likewise integrated on the integrated optics module IOB, whereas the electrical assemblies of the optical amplifier are advantageously integrated in the integrated circuit module IC without this having to be shown in greater detail on the drawing. The light waveguide telecommunication system, whereof only a portion is sketched on the drawing, can continue toward the left and toward the right and may thereby also potentially branch, whereby further integrated optical switch modules can be provided in the LWG path.

In the light waveguide telecommunication system, whereof a portion is sketched on the drawing, the light of a wavelength $\lambda 2$ modulated with a bit rate of, for example, 2 Mbit/s or even a few Gbit/s and having useful signals and light of the wavelength $\lambda 1$ modulated with control signals are transmitted via the light waveguide path LWL-LWL. This occurs in tight wavelength-division multiples, i.e. the two wavelengths $\lambda 1$ and $\lambda 2$ lie in one and the same optical window, for example at 1300 nm or 1500 nm. The control signals respectively formed with a switch address and with a switch instruction indicate what switch in the light waveguide telecommunication system is to be actuated in what manner and at what time. The bit rate with which the light of the wavelength $\lambda 1$ is modulated for this purpose is extremely low in comparison to the bit rate of the useful signal since control signals need only be transmitted with a switch is to be actuated. In the integrated optics module IOB, the light of both of the wavelengths $\lambda 1$ and $\lambda 2$ is first supplied to the optical amplifier OV in order to compensate the transmission losses of the light of both wavelengths that occurred in the network.

Following the optical amplifier OV, one part of the light of the wavelength $\lambda 1$ that carries the control signals is coupled out in the optical demultiplexer Dex. Since the bit rate of the control signals is significantly lower than the bit rate of the useful signals, the attenuation of the control signals is lower than the attenuation of the useful signals, so that adequate control signal energy is available in the out coupling path lwl of the optical demultiplexer Dex. The out-coupled optical signals are supplied to the photodiode PD and are converted into electrical signals by the photodiode PD. The control signals are amplified in the following amplifier EV that, since it is an extremely narrow-band amplifier, can be extremely sensitive, being amplified in order to be subsequently decoded in the decoder circuit Dec. When the switch address contained in a contol signal just received agrees with the address of the optical switch OS located on the integratd optics module IOB now under consideration, this optical switch OS is supplied from the decoder circuit Dec with a switch signal corresponding to the switch instruction contained in the control signal just received, so that the optical switch OS switches in accordance with the switch instruction (open or closes).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A light waveguide telecommunication system, comprising:
   a light waveguide path for carrying optical useful information signals and optical control signals of respective first and second wavelength, said optical control signals including switch address and switch instruction signals;
   at least one optical switch in said light waveguide path having an address and selectively operable in response to respective electrical control signals to couple out or not couple out the optical useful information signals from said light waveguide path;
   an optical demultiplexer in said light waveguide path for separating said optical control signals from said optical useful information signals, said at least one optical switch coupled to said optical demultiplexer to receive said optical useful information signals;
   an opto-electrical transducer coupled to said optical demultiplexer to receive and convert said optical control signals into corresponding electrical address and instruction signals; and
   decoding means connected between said opto-electrical transducer and said at least one optical switch for decoding the address and instruction signals and operating said at least one optical switch in accordance with the decoded instruction signals as the electrical control signals when the address signals identify said at least one optical switch.

2. The light waveguide telecommunication system of claim 1, wherein:
   said decoding means comprises a decoder connected to said at least one optical switch and an electrical signal amplifier connected between said opto-electrical transducer and said decoder.

3. The light waveguide telecommunication system of claim 2, wherein:
   said optical demultiplexer, said optical switch and said opto-electrical transducer are combined in an integrated optics module.

4. The light waveguide telecommunication system of claim 2, and further comprising:
   an optical amplifier in said light waveguide path preceding said optical demultiplexer.

5. The light waveguide telecommunication system of claim 4, wherein:
   said optical amplifier comprises optical components which are combined with said optical demultiplexer, said optical switch and said opto-electrical transducer in an integrated optics module.

6. The light waveguide telecommunication system of claim 5, and further comprising:
   an integrated circuit module including said decoder and mounted on said integrated optics module.

7. The light waveguide telecommunication system of claim 6, wherein:
   said electrical signal amplifier is integrated in said integrated circuit module.

8. The light waveguide telecommunication system of claim 6, wherein:
   said optical amplifier comprises electrical components integrated in said integrated circuit module.

9. A light waveguide telecommunication system comprising:
   an optical amplifier including optical components and electrical components; an integrated optics module including an optical switch, an optical demultiplexer, said optical components of said optical amplifier and an opto-electrical transducer integrated therein;
   an incoming light waveguide coupled to said optical components of said optical amplifier and carrying optical useful information signals and optical control signals of respective first and second wavelength, said optical control signals including switch address and switch instruction signals;
   an outgoing light waveguide coupled to said optical switch;
   at least one further light waveguide coupled to said optical switch and to be coupled to said incoming light waveguide by way of said optical switch;
   an integrated circuit module mounted on said integrated optics module and including said electrical components of said optical amplifier, a signal amplifier connected to said opto-electrical transducer, and a decoder connected to said electrical signal amplifier and to said optical switch;
   said demultiplexer coupled to said optical amplifier and coupled to said optical switch and effective to couple the optical useful information signals thereto and separate the optical control signals from the optical useful information signals and to couple said optical control signals to said opto-electrical transducer,
   said decoder operable to produce electrical control signals for said optical switch in response to receipt of address signals indentifying said optical switch to cause said optical switch to be selectively transmissive for the optical useful informtion signals between said demultiplexer and said outgoing light waveguide and via said at least one further light waveguide in response to said electrical control signals.

* * * * *